United States Patent
Bachar et al.

(10) Patent No.: US 10,015,384 B2
(45) Date of Patent: Jul. 3, 2018

(54) DUAL VOICE COIL MOTOR STRUCTURE IN A DUAL-OPTICAL MODULE CAMERA

(71) Applicant: Corephotonics Ltd., Tel-Aviv (IL)

(72) Inventors: Gil Bachar, Tel-Aviv (IL); Ephraim Goldenberg, Ashdod (IL); Gal Avivi, Haifa (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 15/117,189

(22) PCT Filed: Feb. 17, 2016

(86) PCT No.: PCT/IB2016/050844
§ 371 (c)(1),
(2) Date: Aug. 6, 2016

(87) PCT Pub. No.: WO2016/156996
PCT Pub. Date: Oct. 6, 2016

(65) Prior Publication Data
US 2018/0048799 A1 Feb. 15, 2018

Related U.S. Application Data

(60) Provisional application No. 62/141,875, filed on Apr. 2, 2015.

(51) Int. Cl.
*H04N 5/225* (2006.01)
*G02B 13/00* (2006.01)
*G02B 7/06* (2006.01)

(52) U.S. Cl.
CPC ............. *H04N 5/2258* (2013.01); *G02B 7/06* (2013.01); *G02B 13/003* (2013.01);
(Continued)

(58) Field of Classification Search
CPC ...... H04N 5/2258; H04N 5/2254; G02B 7/06; G02B 13/003; G03B 2205/0015; G03B 2205/0069

See application file for complete search history.

(56) References Cited

U.S. PATENT DOCUMENTS 8,743,179 B2 6/2014 Ryu et al.
2010/0182490 A1* 7/2010 Seol ............... H04N 5/2254
348/345

(Continued)

FOREIGN PATENT DOCUMENTS

CN 105187695 A 12/2015
JP 2011-085666 4/2011
(Continued)

OTHER PUBLICATIONS

International Search Report and Written Opinion issued in related PCT patent application PCT/IB2016/050844 dated Jul. 26, 2016, 9 pages.

(Continued)

*Primary Examiner* — Gevell Selby
(74) *Attorney, Agent, or Firm* — Nathan & Associates; Menachem Nathan (57) ABSTRACT

Dual-optical module autofocus (AF) or AF plus optical image stabilization (OIS) cameras with reduced footprint and reduced mutual magnetic interference. Some AF+OIS cameras may include a single AF actuation assembly that moves two lens barrels in unison. Some AF cameras or AF+OIS cameras may have two AF actuation sub-assemblies and associated magnets for independent AF operation of each lens barrel, the magnets shared in a manner that cancels magnetic influences of one AF actuation sub-assembly on the other AF actuation sub-assembly, thereby allow- (Continued)

ing the two lens barrels to be positioned in close proximity, saving parts and fabrication costs.

10 Claims, 12 Drawing Sheets

(52) U.S. Cl.
CPC ... *H04N 5/2254* (2013.01); *G03B 2205/0015* (2013.01); *G03B 2205/0069* (2013.01)

(56) References Cited

U.S. PATENT DOCUMENTS

| | | |
|---|---|---|
| 2011/0050921 A1 | 3/2011 | Noto |
| 2011/0286099 A1 | 11/2011 | Shiraki et al. |
| 2012/0314307 A1* | 12/2012 | Ikushima ............ G02B 27/646 |
| | | 359/814 |
| 2014/0327965 A1 | 11/2014 | Chen et al. |
| 2015/0070781 A1 | 3/2015 | Cheng et al. |
| 2015/0244942 A1* | 8/2015 | Shabtay ............... H04N 5/2257 |
| | | 348/240.3 |
| 2015/0316744 A1* | 11/2015 | Chen ...................... H04N 5/247 |
| | | 359/824 |
| 2016/0209618 A1 | 7/2016 | Avivi et al. |
| 2016/0231528 A1* | 8/2016 | Wong ..................... G01D 5/142 |
| 2017/0094183 A1* | 3/2017 | Miller ................ H04N 5/23296 |

FOREIGN PATENT DOCUMENTS

| | | |
|---|---|---|
| KR | 20110135502 | 12/2011 |
| WO | 2014100516 A1 | 6/2014 |
| WO | 2014062854 | 1/2015 |
| WO | 2014062181 | 8/2015 |

OTHER PUBLICATIONS

Extended European Search Report and Written Opinion issued in related EP patent application 16771471.6, dated Feb. 21, 2018, 11 pages.

* cited by examiner

DUAL VOICE COIL MOTOR STRUCTURE IN A DUAL-OPTICAL MODULE CAMERA

CROSS REFERENCE TO RELATED APPLICATIONS

This application is a 371 application from international patent application PCT/IB2016/050844, and related to and claims priority from US Provisional Patent Application No. 62/141,875 filed Apr. 2, 2015 and having the same title, which is incorporated herein by reference in its entirety.

FIELD

Embodiments disclosed herein relate in general to dual or multi-voice coil motor (VCM) structures and in particular to dual-VCM structures used in miniature dual-optical or more module cameras.

BACKGROUND

A compact (miniature) dual-optical module camera (also referred to as "dual-aperture camera", "dual-lens camera" or simply "dual-camera"), as e.g. in a smart-phone, can be used in conjunction with appropriate computational photography algorithms for several purposes. These include achieving advanced digital zoom, lowering total module height while keeping high performance, improving low-light performance and creating depth maps. In order to simplify the computational photography algorithms and thus reduce time and errors, it is required that the two cameras be set as closely proximate as possible. In compact camera modules, the most ubiquitous form of achieving auto-focus (AF) and/or optical image stabilization (OIS) is by actuating (shifting) an imaging lens (or simply "lens") module of the camera with respect to the camera sensor(s). The most common actuator type in such cameras is the voice coil motor (VCM). A VCM actuator includes coils, fixed (also referred to as "permanent" or "hard") magnets and springs. When current is driven through a coil, an electro-magnetic (EM) Lorentz force is applied on it by the magnetic field of the magnets and the lens module changes position. The EM force is balanced against the springs to achieve the required position.

In dual-aperture photography, two camera modules enable taking two images of the same scene simultaneously. Each camera may include one or more VCM (or other magnetic) actuator(s) for AF and OIS purposes. When using VCM actuators, the two VCM actuators are positioned in close proximity. The two camera modules may have identical or different optical elements (lens modules/lenses). Each VCM actuator needs then to actuate its respective lens module according to the optical demands Each VCM actuator needs to operate separately, preferably as if it were not coupled magnetically to the other VCM actuator (i.e. as if it were a standalone module).

Two VCM actuators in close proximity may interfere with each other's magnetic field and may not work properly. This interference limits the minimal distance between the actuators and/or requires unique magnetic structures and changes to the VCM. A small distance is advantageous for minimizing camera footprint and for simplifying computational photography algorithms and calculations, because it results in smaller parallax.

Known solutions to the proximity problems posed by miniaturized dual-optical module cameras include use of off-the-shelf actuators and some means for magnetic shielding (see e.g. PCT patent application PCT/IB2014/062181). The latter limits the proximity achievable in the positioning of two actuators in a single camera. Another solution includes a VCM that houses two lenses that move together (see e.g. PCT patent application PCT/IB2014/062854).

There is therefore a need for, and it would be advantageous to have ways to construct a magnetically stable structure that can house two lens modules in close proximity to each other, and actuate each lens barrel in an independent way for AF purposes. In addition there is a need for an OIS mechanism coupled to such a structure.

SUMMARY

In various embodiments there are disclosed multi-optical module AF or AF+OIS imaging devices (cameras) and in particular dual-optical module cameras, each dual-optical module camera having two AF actuation sub-assemblies, the cameras having improved VCM magnetic design, reduced part numbers and reduced footprint. In each such camera, magnets provided for the two AF actuation sub-assemblies are shared in a manner that allows two lens modules to be assembled in very close proximity, removing the need for a magnetic shield therebetween.

Hereinafter, the term "lens" is used instead of "imaging lens" for simplicity.

In an exemplary embodiment, there is provided an imaging device comprising: a first lens module having a first optical axis and including a first lens carrier with a first lens carrier external surface, the first lens carrier having a first coil wound around at least part of the first lens carrier external surface; a second lens module having a second optical axis parallel to the first optical axis and including a second lens carrier with a second lens carrier external surface, the second lens carrier having a second coil wound around at least part of the second lens carrier external surface; a first plurality of magnets surrounding the first coil, and a second plurality of magnets surrounding the second coil, wherein the first and second pluralities of magnets share at least one common magnet, and wherein each of the first and second plurality of magnets is associated with an auto-focus actuation of the respective lens module.

In an exemplary embodiment, the magnets of the first plurality have north poles pointing toward the first optical axis and the magnets of the second plurality have south poles pointing toward the second optical axis. Exemplarily, the first and second pluralities of magnets may include a combined total of four to seven magnets. The magnets may exemplarily be rigidly coupled to a frame. Each lens carrier and associated coil may move relative its respective plurality of magnets and the frame, wherein the movement of each lens carrier and its associated coil is independent of the movement of the other lens carrier and its associated coil.

In some exemplary embodiments, an imaging device may further comprise a board having attached thereto a plurality of OIS coils, each OIS coil associated with at least one of the magnets from the first or second plurality of magnets, wherein the frame is movable relative to the board in a plane substantially perpendicular to both optical axes as a result of magnetic forces developing between at least some of the OIS coils and their respective associated magnets when a current is passed in respective OIS coils. A position sensing mechanism that exemplarily includes at least one Hall bar may be used for sensing motion in a plane perpendicular to each optical axis and/or for sensing roll motion around an optical axis. The sensing of position in one direction is independent of the sensing of position in another direction.

In an exemplary embodiment, there is provided an imaging device comprising: a first lens module having a first optical axis; a second lens module having a second optical axis parallel to the first optical axis; a lens carrier housing the first and second lens modules, the lens carrier having an external carrier surface with a coil wound around at least part of the external carrier surface; a plurality of magnets surrounding the coil; and a housing frame for housing the plurality of magnets, the housing frame hung by springs above a board having attached thereto a plurality of OIS coils, each OIS coil associated with at least one of the magnets, wherein the housing frame is movable relative to the board in a plane substantially perpendicular to both optical axes as a result of magnetic forces developing between at least some of the coils and their associated magnets when a current is passed in respective OIS coils, and wherein the first and second lens modules are configured to undergo simultaneous auto-focusing operations.

A position sensing mechanism that exemplarily includes at least one Hall bar may be used for sensing motion in a plane perpendicular to each optical axis and/or for sensing roll motion around an optical axis. The sensing of position in one direction is independent of the sensing of position in another direction.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure may be labeled with a same numeral in the figures in which they appear. The drawings and descriptions are meant to illuminate and clarify embodiments disclosed herein, and should not be considered limiting in any way.

DETAILED DESCRIPTION

All figures described next are drawn in a three axis (X-Y-Z) reference frame in which the axes are defined as follows: the Z axis is parallel to the optical axes of two lens modules and perpendicular to the surface of camera sensors. The Y axis is perpendicular to the optical axes of the two lenses and parallel to the camera sensor surfaces. The Y axis is also perpendicular to the shortest line connecting the optical axes of the two lens modules. The X axis is perpendicular to the optical axes of the two lenses, parallel to the camera sensor surfaces and parallel to the shortest line connecting the optical axes of the two lenses.

Figure 1A:
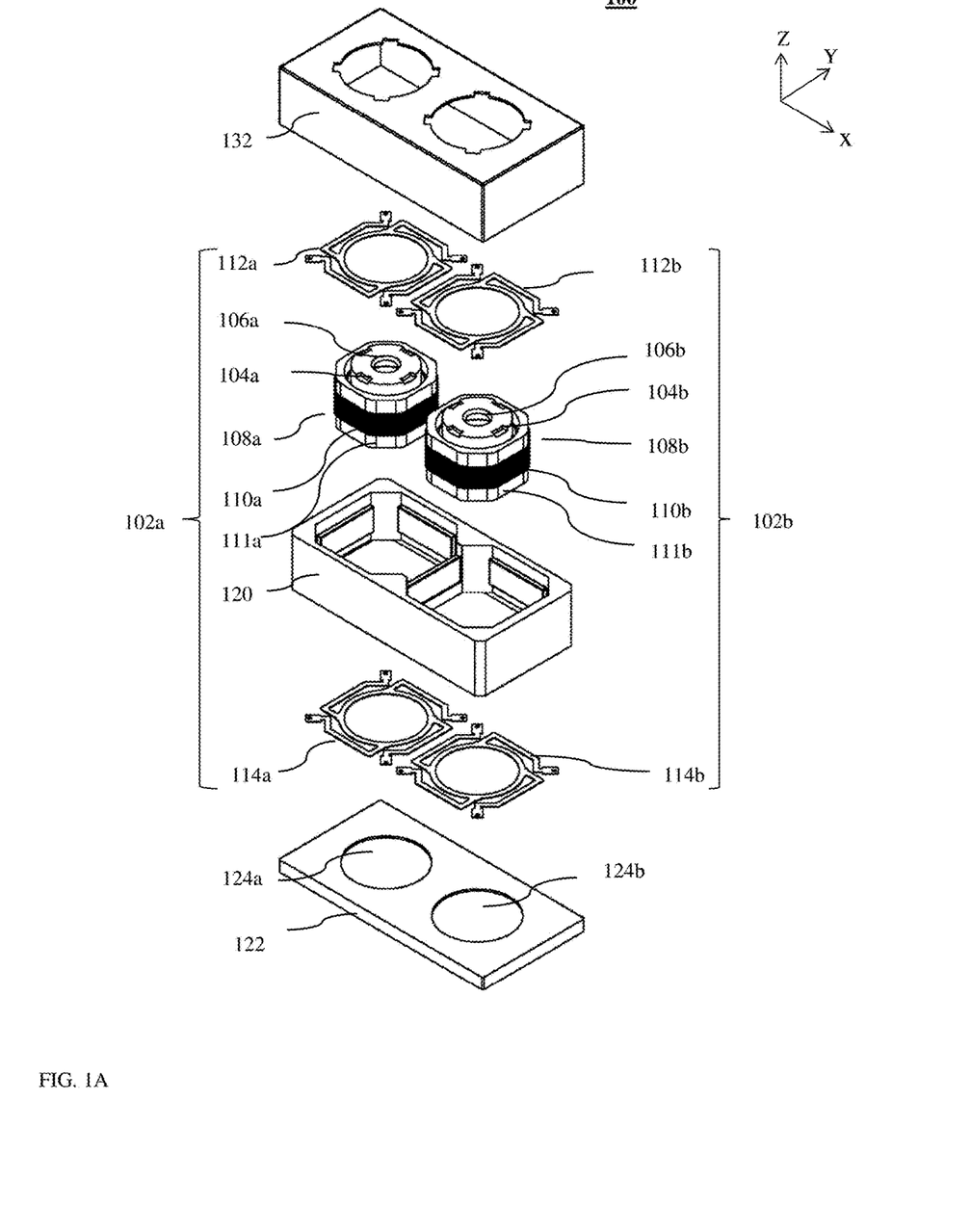
FIG. 1A shows schematically an exploded view of embodiment of a dual-aperture camera having a dual VCM AF actuator disclosed herein.
Figure 1B:
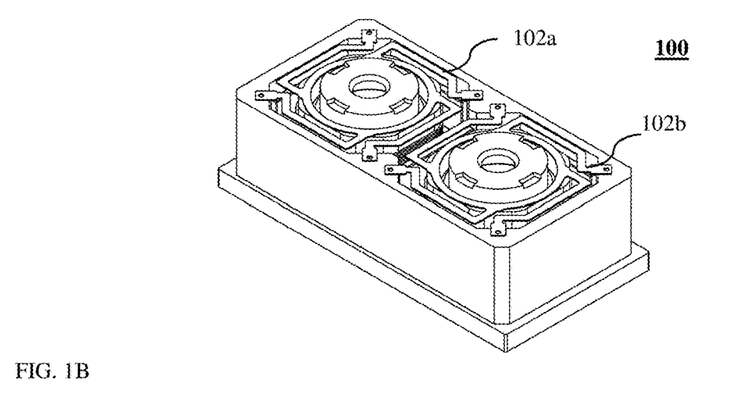
FIG. 1B shows an isometric view of the camera of FIG. 1A.
Figure 1C:
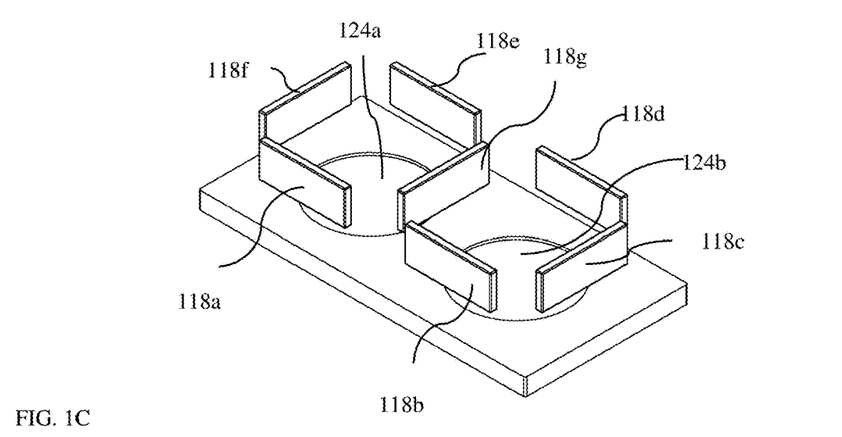
FIG. 1C shows an isometric view of a first magnet set embodiment with seven magnets in the camera of FIG. 1B.
Figure 1D:
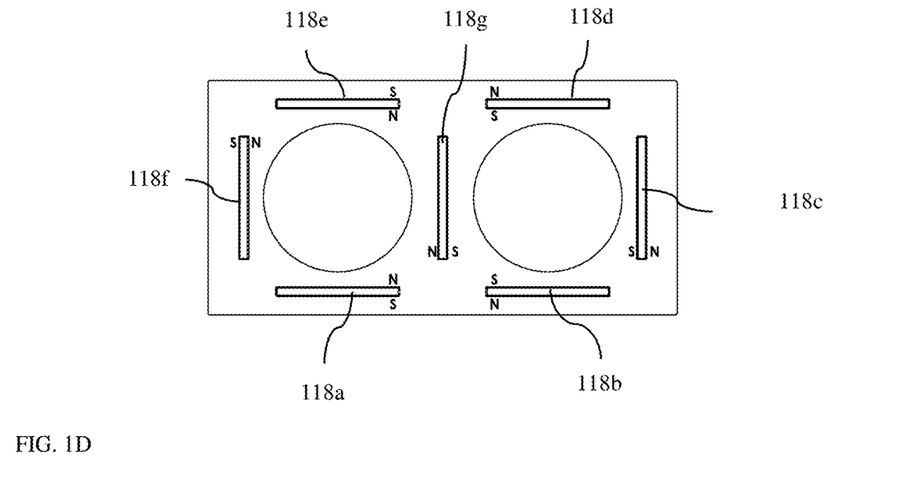
FIG. 1D shows a top view of the seven magnets of the embodiment in FIG. 1C and associated pole directions.

FIG. 1A shows schematically an exploded view of embodiment 100 of a dual-optical module camera having a dual-VCM AF actuator disclosed herein. FIG. 1B shows camera 100 in an isometric view, FIG. 1C shows an isometric view of a magnet set embodiment with seven magnets, and FIG. 1D shows a top view of the seven magnets of the embodiment in FIG. 1C and associated pole directions.

Dual-optical module camera 100 includes two AF actuation sub-assemblies 102a and 102b. Each AF actuation sub-assembly includes an optical lens module, respectively 104a and 104b, each lens module including a lens element, respectively 106a and 106b, optically coupled to a respective image sensor (not shown but described below). Each lens module may have dimensions as follows: a diameter in the range 6-7 mm, a height of about 4 mm and a fixed focal length in the range of 4-8 mm. The two lens barrels may be identical or may be different in some parameters such as focal length, diameter and F#. Each lens barrel is housed in a separate lens carrier, respectively 108a and 108b. The lens carriers are typically (but not necessarily) made of a plastic material. Each lens carrier has a coil (respectively 110a and 110b) wound around at least part of an external carrier surface (respectively 111a and 111b). The coil is typically made from copper wire coated by a thin plastic layer (coating) having inner/outer diameters of respectively in the range of 50-60 μm, with several tens of turns per coil such that the total resistance is typically on the order of 10-30 ohms per coil.

Each AF actuation sub-assembly further includes a spring set, each spring set including two (upper and lower) springs. Thus, a first spring set of actuation sub-assembly 102a includes an upper spring 112a and a lower spring 114a, while a second spring set of sub-actuation assembly 102b includes an upper spring 112b and a lower spring 114b. Springs 112a, 112b, 114a, 114b may all be identical, as shown in this embodiment. In other embodiments, they may vary in shape, spring constants, dimensions and materials. Each set of springs acts a single linear rail that suspends the AF actuation sub-assembly. The linear rail is typically flexible in one direction of motion, namely along the Z axis (optical axis of the suspended lens), with a typical stiffness of 20-40 N/m, and is very stiff along the other two axes of motion, namely in the X-Y plane (or perpendicular to the optical axis of the suspended lens), with a typical stiffness >500 N/m.

Camera 100 further includes a set of seven magnets (numbered 118a-g), all housed (glued) in a single plastic or metallic frame 120. Frame 120 encases magnets 118a-g. Magnets 118a-g may all be identical, as in this embodiment. In other embodiments, they may vary in shape, magnetic field, dimensions and materials. The magnets arrangement is described in detail below. The spring sets of the two actuation sub-assemblies are hung on frame 120 and allow motion as described above. The two AF actuation sub-assemblies, the frame and the seven magnets form a "combined" actuation assembly referred to hereinafter as a "dual-AF-actuation" assembly.

Frame 120 is fixed onto a base 122, by glue or other means, normally made of a plastic material. Base 122 includes openings (round holes) 124a and 124b for two image sensors (not shown). The image sensors are typically rectangular, with diagonal length in the range of ¼" to ½". The image sensors may be identical or different in size, type of sensing mechanism, etc. Each of the sensors is positioned just below of the two actuation sub-assemblies 102a and 102b on a printed circuit board ("PCB"—not shown) and acquires a respective image in a known fashion. The actuation (motion) of the actuation sub-assemblies in the Z direction allows focusing of the light coming from images at various distances from the camera on the image sensors. Finally, camera 100 includes a shield 132, typically made from stainless steel, which protects all components included therein for mechanical damage, dust and stray light.

Figure 1E:
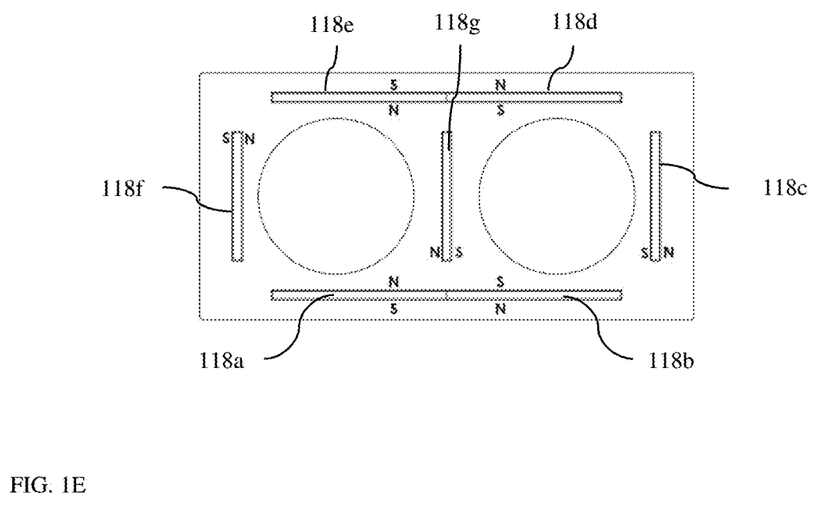
FIG. 1E shows a top view of another magnet set embodiment with five magnets and associated pole directions in a camera embodiment as in FIG. 1A.

FIG. 1E shows a top view of another magnet set embodiment in which magnets 118a+118b and 118d+118e are joined (e.g. sintered) with poles as shown, essentially reducing the number of magnets from seven to five. Such "joined" magnets are known in the art, and described for example in PCT patent application WO2014/100516A1.

Figure 2A:
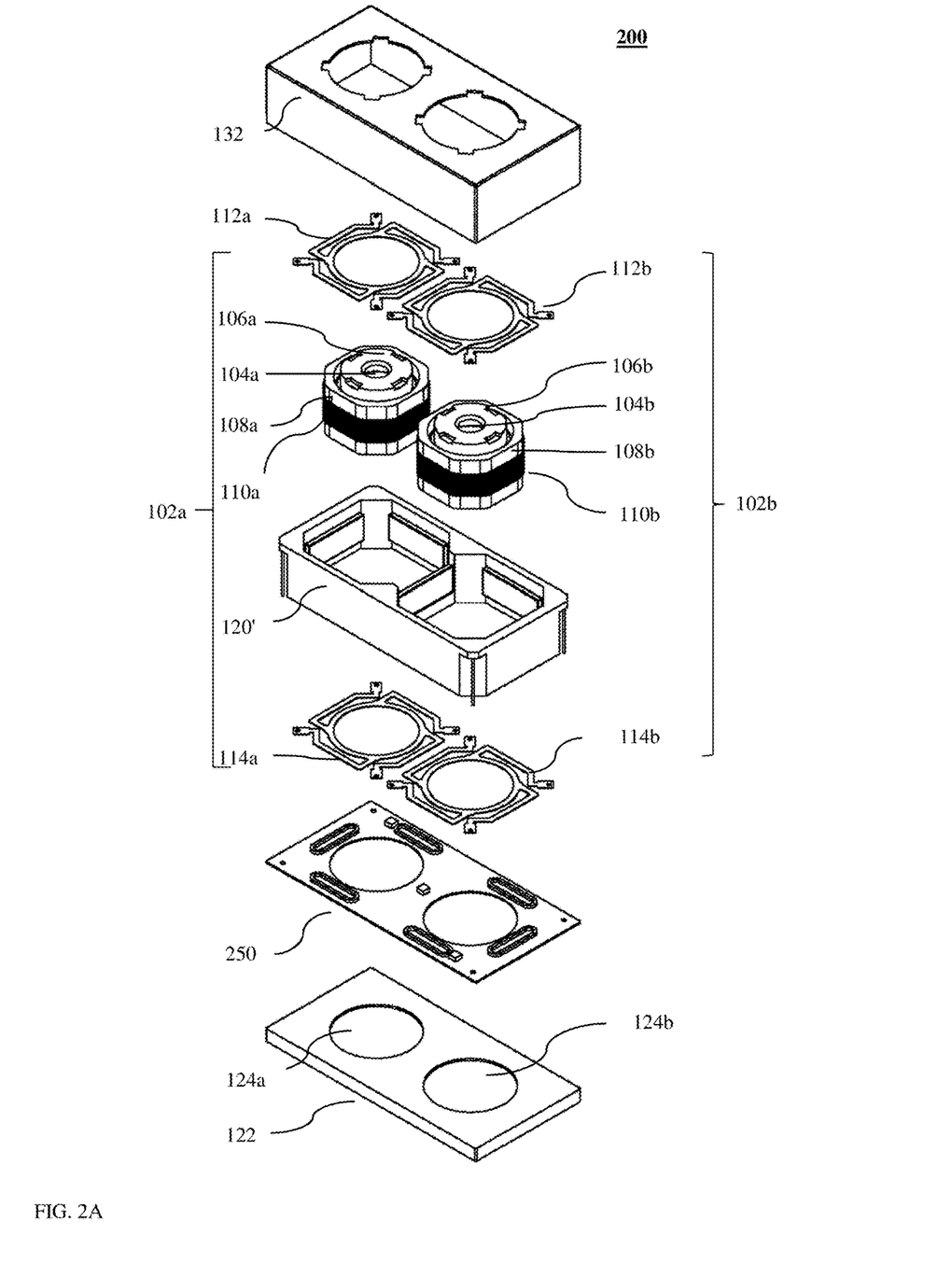
FIG. 2A shows schematically an exploded view of embodiment of a dual-optical module camera having a dual VCM AF+OIS actuator disclosed herein.
Figure 2B:
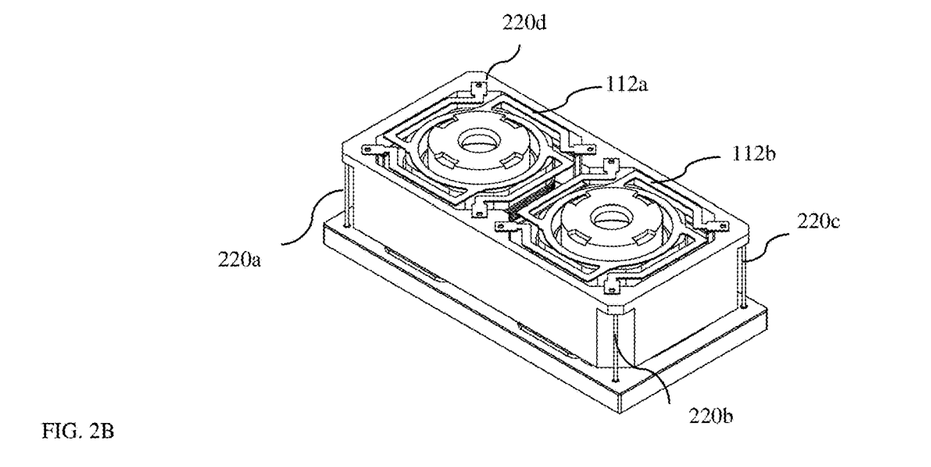
FIG. 2B shows an isometric view of the camera of FIG. 2A.
Figure 2C:
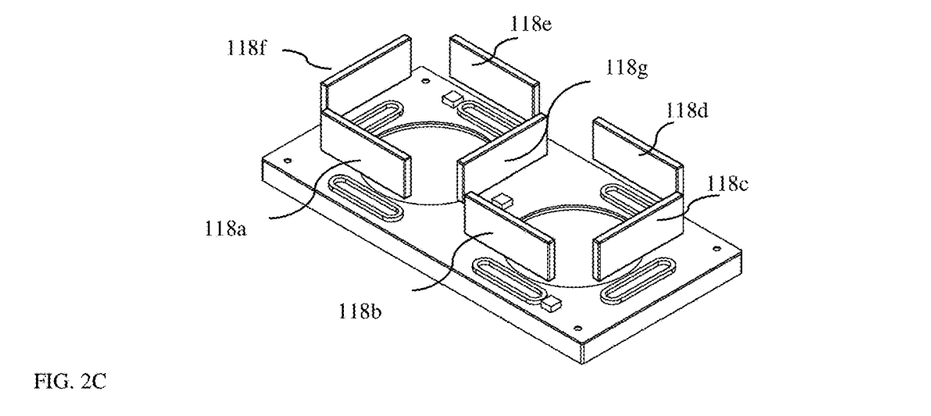
FIG. 2C shows an isometric view of a first magnet set embodiment of seven magnets in the camera of FIG. 2B.
Figure 2D:
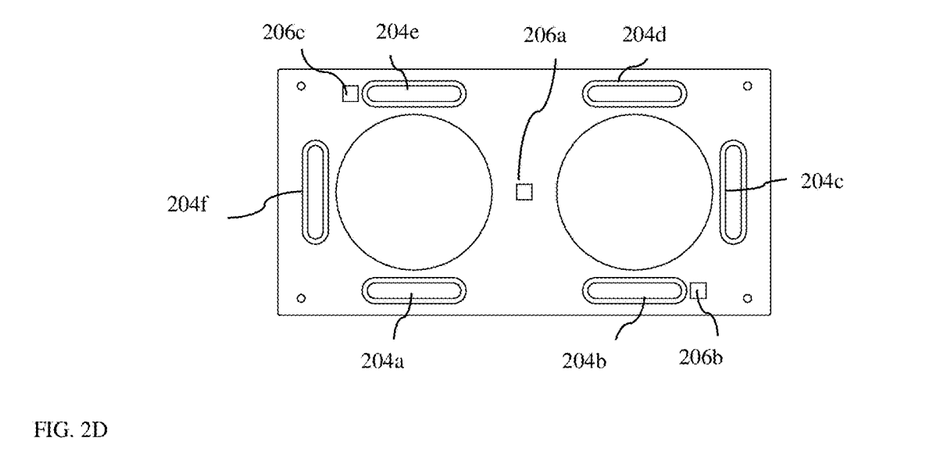
FIG. 2D shows a top view of six coils under the seven magnets of the embodiment in FIG. 2C.
Figure 2E:
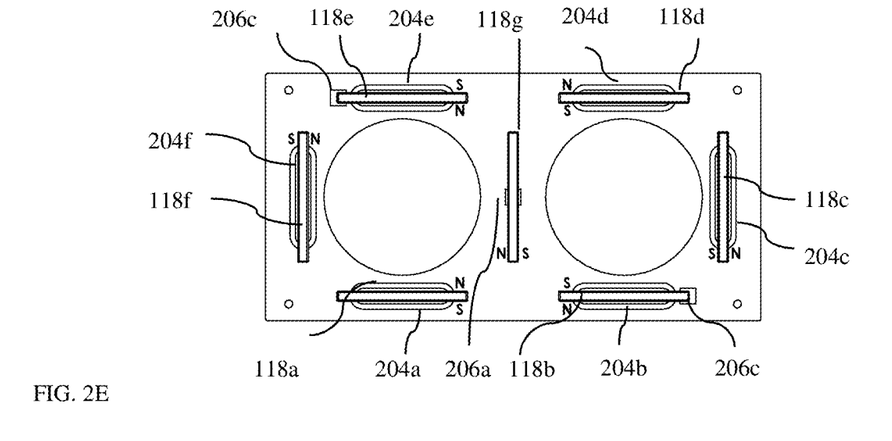
FIG. 2E shows a top view of the seven magnets of the embodiment in FIG. 2C on top of the six coil, and associated magnet pole directions.

FIG. 2A shows schematically an exploded view of embodiment 200 of a dual-optical module camera having a combined dual VCM AF and OIS actuator. FIG. 2B shows camera 200 in an isometric view, FIG. 2C shows an isometric view of a magnet set embodiment with seven magnets. FIG. 2D shows a top view of six coils under the seven magnets. FIG. 2E shows a top view of the seven magnets on top of the six coils and associated magnet pole directions.

Camera 200 includes all the components of camera 100 as well as additional components, with differences as follows: in camera 200, a frame 120' is not fixed onto base 122 but is rather suspended on a suspension spring system comprising four springs 220a, 220b, 220c and 220d (FIG. 2B). The springs are typically made of thin round wires and form a suspension mechanism known in the art, see e.g. co-owned U.S. patent application Ser. No. 14/373,490 to Corephotonics Ltd. This mechanical structure is further analyzed below. In some embodiments, other types of springs (e.g. of rectangular cut or oval) may be used. In some embodiments, more than four springs may be used. Camera 200 further includes OIS motion coils 204a-f positioned on a PCB 250 which is glued on base 122. Coils 204a-f are positioned under respective magnets 118a-e and apply a Lorentz force on the respective magnets. Camera 200 further includes sensing elements (e.g. Hall bars) 206a-c (FIG. 2C) that can measure a magnetic field and indicate the position of the dual-AF-actuation assembly, for example as in US 20140327965A1. Such a motion in the X-Y plane allows performance of OIS, by compensating for hand movements that shift and tilt the camera module with respect to the object to be captured, as known in the art.

Coils 204a-f may be operated in various actuation modes. In some such actuation modes, currents are directed through only some of the coils. In some actuation modes, current are directed through all of the coils. As explained below, in all modes of operation there is a complete decoupling between different modes of motion, namely the two Z-direction motions of the two lenses relative to frame 120 (or 120') and the X-Y motion of frame 120' relative to the base.

Figure 2F:
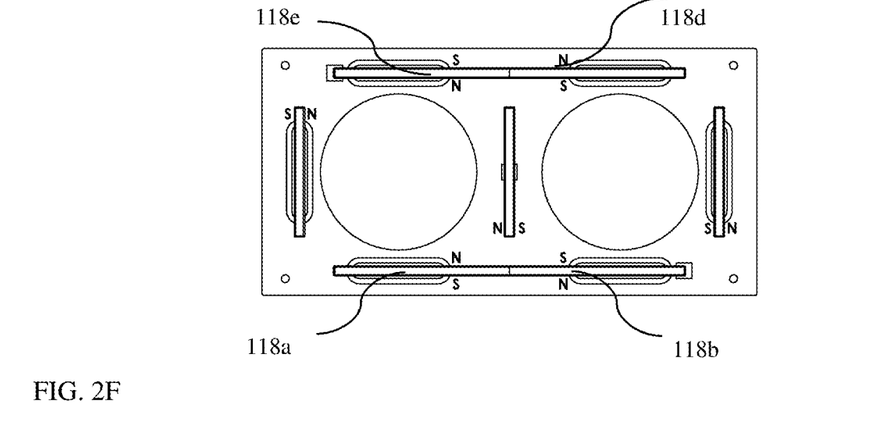
FIG. 2F shows a top view of another magnet set embodiment with five magnets and associated pole directions in a camera embodiment as in FIG. 2A.

FIG. 2F shows a top view of another magnet set embodiment in which magnets 118a+118b and 118d+118e are joined (e.g. sintered) with poles as shown, essentially reducing the number of magnets from seven to five.

Four-Wire Spring Mechanical Structure

A mechanical structure consisting of four round wires is typically used for in-plane motion in OIS mechanisms, see e.g. co-owned U.S. patent application Ser. No. 14/373,490 to Corephotonics Ltd. For wires with typical diameter ranges of 50-100 μm typically made from metal (for example: stainless-steel alloy) and carrying a dual AF-actuation assembly with a total mass of 0.5-1 gram, the following typical modes of motion are created:

| Motion mode | Typical spring constant range | Typical frequency range |
| --- | --- | --- |
| X | 40-60 N/m | 30-60 Hz |
| Y | 40-60 N/m | 30-60 Hz |
| Z | ~250000 N/m | ~3000-4000 Hz |
| Roll around X | ~5 N * m/rad | ~5000-6000 Hz |
| Roll around Y | ~1.25 N * m/rad | ~3000-4000 Hz |
| Roll around Z | ~0.001 N * m/rad | ~60-100 Hz |

For motion in three modes, the X mode, the Y mode and the "roll around Z" mode, the typical frequency range is much lower than for the other three modes. The physical meaning of this fact is that motion in Z mode, roll around X mode and roll around Y mode are much stiffer and are unlikely to occur under low forces like those that exist in the system (order of 0.01N).

As explained above, motion in the X-Y plane allows OIS performance. In the cases known in the art of a single aperture camera module (for example in PCT/IB2014/062181), a roll motion around the Z (optical) axis will not influence the image, since lens modules are axis-symmetric around this axis. In the cameras disclosed herein, a roll around the Z axis may cause distortion or shift the image, and is thus unwanted. Therefore, a cancellation method provided herein for this mode is disclosed below.

Electrical Connectivity

Two wire electrical connections are needed per coil, for current input and output, for each coil in the embodiments demonstrated. For camera 100 and for the moving coils 110a and 110b in the of two AF actuation sub-assemblies, is it desired that the electrical connections not add any external limitation (i.e. external forces, friction, etc.) on the moving structure. As in typical cases (see for example patent WO2014/100516A1), springs 112a-b and 114a-b can covey the current. In an embodiment, springs 112a and 114a may convey the current for coil 110a (in and out, respectively), while springs 112b and 114b may convey the current for coil 110b (in and out, respectively). In an embodiment, spring 112a may be split to two halves, such that mechanically it serves as a single spring while each half serves as a single electrical connection for coil 110a. Similarly, spring 112b may be split to two halves, such that mechanically it serves as single spring, while each half serves as a single electrical connection for coil 110b.

For camera 200, currents are needed to be further conveyed from the moving AF assembly to the stationary base 122. Springs 220a-d may serve for this purpose as follows: springs 220a and 220d may convey currents from AF actuation sub-assembly 102a to base 122, while springs 220b and 220c may convey currents from AF actuation sub-assembly 102b to base 122.

Magnetic and Mechanical Analysis

The VCM force mechanism is based on Lorentz's law. The Lorentz force is known to be equal to:

$$F = I \int dl \times B$$

where I is the current in the coil, B is the magnetic field, and $\vec{dl}$ is a wire element. Thus, only a magnetic field perpendicular to the wire creates force in the desired motion direction. The magnetic field term in the Lorentz force equation is applied on the wire by the permanent magnets. In addition, from Newton's third law of force, an equal but opposite force is applied on the permanent magnet by the coils.

Attention is now drawn to FIG. 1C and FIG. 2C, where only the elements active in the magnetic circuits appear. The poles of each of the magnets are arranged as indicated in FIGS. 1C-1D (2C-2D). Namely, the north pole is toward the positive Y direction for magnets 118a and 118d, toward the negative Y direction for magnets 118b and 118e the north pole, toward the positive X direction for magnets 118c and 118f, and toward the negative X direction for magnet 118g.

It can be seen that for actuation sub-assembly 102a (and in particular for coil 110a), the north magnetic poles are positioned inward, making the magnetic field flow inward. The first actuation mode to be analyzed is the actuation mode related to motion in the Z axis. If a current in coil 110a flows in a counter clockwise direction, according to Lorentz's law a force in the positive Z direction will be applied on coil 110a and thus on the lens carrier 108a and lens 106a attached thereto. This force is independent and does not affect actuation sub-assembly 102b, i.e. coil 110b, lens carrier 108b or lens 106b. In the same manner, it can be seen that for actuation sub-assembly 102b (and in particular coil 110b), the magnetic field flows outward. Thus, if a current in coil 110b flows in a clockwise direction, according to Lorentz's law a force in the positive Z direction will be applied on the coil, and thus on the lens carrier 108b and lens 106b attached thereto. This force is independent and does not affect actuation sub-assembly 102a (coil 110a, lens carrier 108a or lens 106a).

Figure 3A:
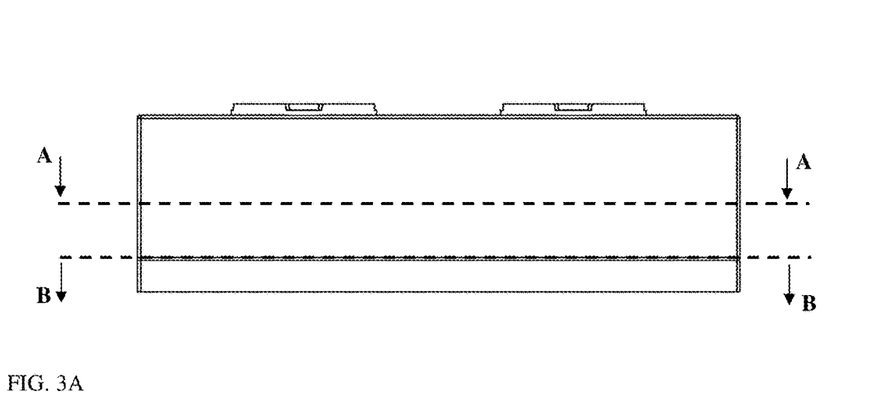
FIG. 3A shows cross sections A-A and B-B in a dual-optical module camera disclosed herein.
Figure 3B:
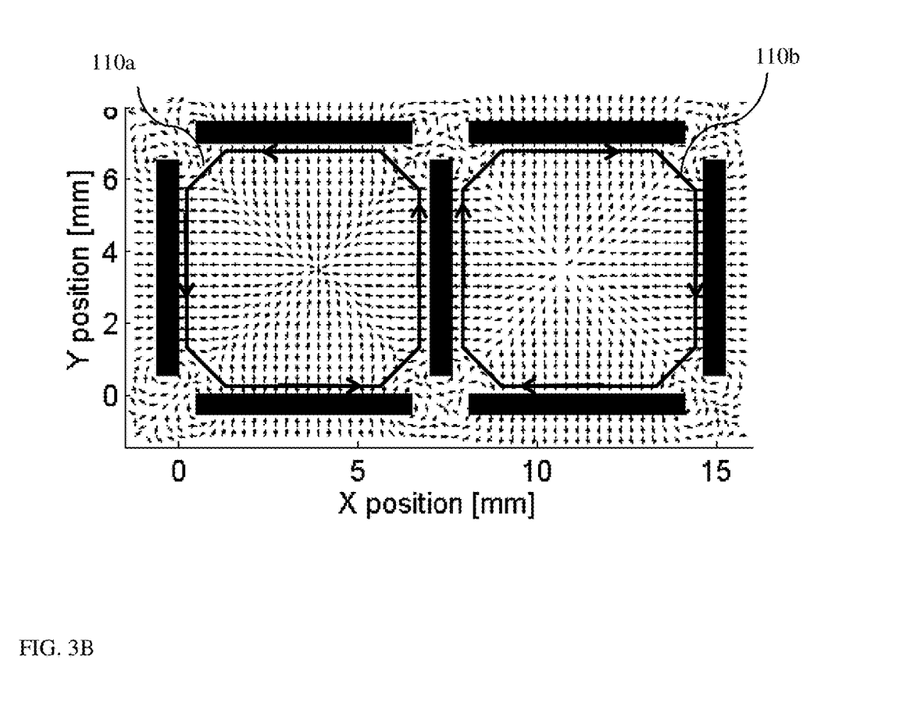
FIG. 3B shows results of a simulation of the magnetic field in the X-Y plane in a dual-optical module camera along cross section A-A.

FIG. 3A shows cross sections A-A and B-B in a dual-optical module camera disclosed herein. FIG. 3B shows results of a simulation of the magnetic field in the X-Y plane along cross section A-A in FIG. 3A, explaining the magnetic forces acting in the AF part of the actuator. Coils 110a and 110b are also indicated, as is the direction of current in the coils (counter-clockwise in coil 110a, clockwise in coil 110b). In this simulation (and the simulation to follow below) we assume magnets with dimensions of 6 mm×1.3 mm×0.6 mm, made from neodymium with magnetic coercively $H_{ci}$=750 kA/m.

As shown, looking at the cross product dl× B on all parts of coil 110a and assuming a counter-clockwise direction of current, the force acting on all parts of the coil is in the positive Z direction (away from the camera sensor). In order to reverse the force direction, the current in coil 110a can be reversed (to be clockwise). For coil 110b, assuming a clockwise direction of current, the force acting on all parts of the two coils is in the positive Z direction (away from the camera sensor). In order to reverse the force direction, the current in coil 110b can be reversed (to be counter-clockwise).

Figure 4A:
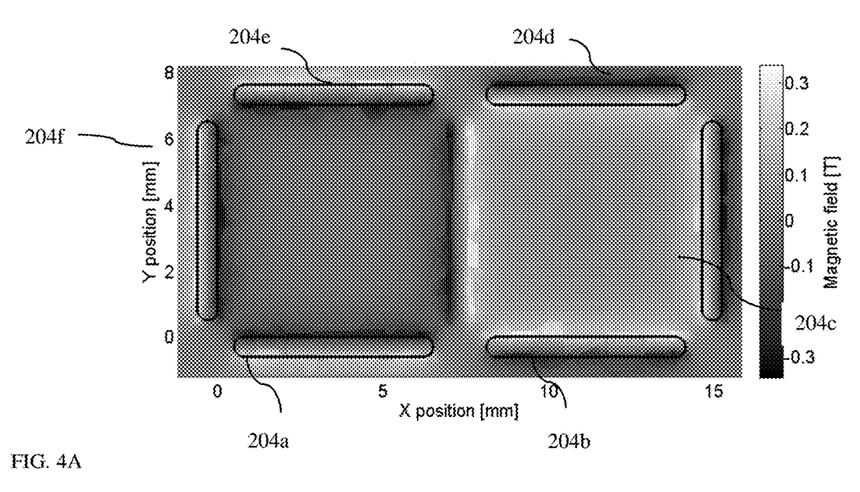
FIG. 4A shows results of a simulation of the magnetic field in the X-Y plane in a dual-optical module camera along cross section B-B.
Figure 4B:
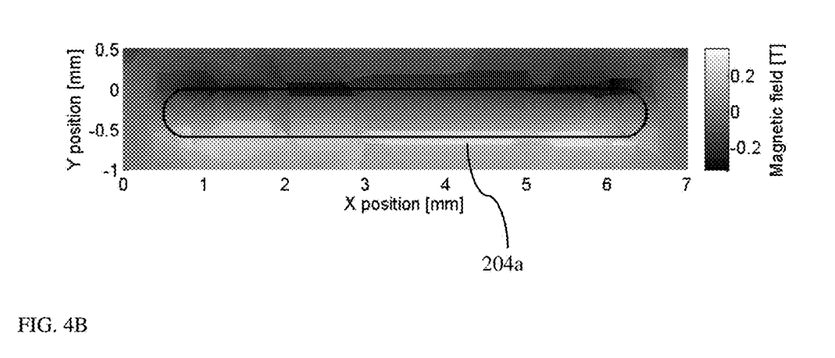
FIG. 4B shows a magnification of an area in FIG. 4A.

Moving to the second and third actuation modes (X-Y plane) used for OIS, FIG. 4A shows simulation results of the magnetic field along section B-B of FIG. 3A. FIG. 4A shows the magnetic field in the Z direction in the X-Y plane, with indication to the position of coils 204a-f. FIG. 4B shows an enlarged view of the lower left section in FIG. 4A, in the vicinity of coil 204a. In FIGS. 4A and 4B, the X and Y axes indicate the position in X-Y plane in mm, whereas the shade of gray indicates the strength of the magnetic field in the Z direction. The shade scale in the two images, which corresponds to the magnetic field strength, is indicated by the bar on the right of each figure.

Figure 5:
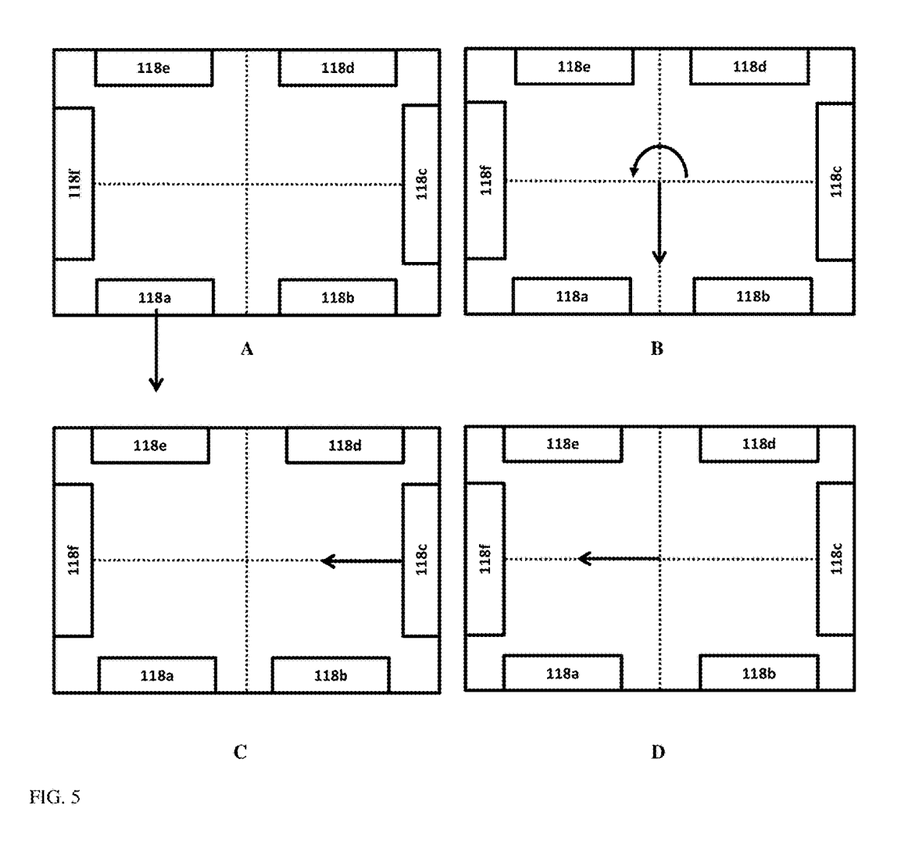
FIG. 5 shows: (A) force applied on magnet 118a and (B) the equivalent center mass force and torque; (C) force applied on magnet 118c and (D) the equivalent center mass force and torque.

When an electric current is passed in coil 204a in a clockwise direction, a force is applied on this coil, which acts mostly in the positive Y direction. For a coil with 24 turns, and 100 mA, separated by 100 um from magnet 118a above it, the force is equal to about 0.0055N (0.55 gram-force). FIG. 5 shows in (A) the force on magnet 118a and (B) the reaction to this force on the center of mass of the dual AF-actuation assembly. The force on magnet 118a is transferred in two parts when applied on the mass center: (1) a net force of 0.0055N in the negative Y direction will be applied on magnet 118a and thus on all elements attached to it rigidly in the X-Y plane, i.e. on the dual AF-actuation assembly; (2) since the magnet is not positioned in the center of mass of the dual AF-actuation assembly, an angular torque of 0.022 N-mm will be generated around the Z axis in a counter-clockwise direction.

Similarly, when an electric current is passed under similar conditions in coil 204d in a clockwise direction, a 0.0055N force is applied on this coil, which acts mostly in the positive Y direction. This force applies a force of 0.0055N in the negative Y direction on magnet 118d and in turn on the dual AF-actuation assembly, and torque of 0.022 N-mm around the Z axis in a clockwise direction. In the same manner, when an electric current is passed in coils 204b and 204e in a counter-clockwise direction, a force is applied on these coils, which acts mostly in the positive Y direction. As a reaction to these forces, a net force in the negative Y direction will be applied on magnets 118b and 118e, respectively. Thus, for similar coils and applied currents, a net force of 0.055N in the negative Y is applied by each magnet on the dual AF-actuation assembly, and torques of 0.022 N-mm in the clockwise and counter-clockwise directions are applied by magnets 118b and 118e respectively.

When an electric current is passed in coils 204c and 204f in a clockwise direction, a force is applied on each coil, the force acting mostly in the positive X direction. As a result, a net force in the negative X direction will be applied on magnets 118c and 118f. FIG. 5 shows in (C) the force on magnets 118c and (D) the reaction of this force on the center of mass of the dual AF-actuation assembly. The force on magnet 118c is transferred in two parts when applied on the mass center: (1) a net force in the negative X direction on the center of mass of the dual AF-actuation assembly; (2) since the force in the X direction acting magnet 118c is balanced around the center of rotation, no torque will be created.

Motion Control in the X-Y Plane

Hall sensor 206a is positioned below magnet 118g, which has poles oriented along the X axis. Thus, this sensor may measure changes in the magnetic field caused by motion in the X direction. Hall sensors 206b and 206c are positioned respectively below magnets 118b and 118e, which have poles oriented along the Y axis. Thus, these sensors may measure changes in the magnetic field caused by motion in the Y direction. If the motion is only in the X or the Y direction, or in any combined direction of the two, measurements of Hall-bar sensors 206b and 206c should be equal. However, if any roll-around-Z-axis motion occurs, since Hall-bar sensors 206b and 206c are positioned along the diagonal of a rectangle, the measurement in these sensors should vary. That is, the roll-around-Z-axis motion can be detected, looking at the difference between the measurements of Hall-bar sensors 206b and 206c.

Using a combination of the six coils 118a-e can create force in the X-Y plane and torque around the Z axis such that the desired motion is achieved, namely creation of X-Y motion as needed for OIS and removal of any unwanted Z-axis-roll.

In summary, the magnet arrangements disclosed herein and their methods of use advantageously allow increasing the proximity of adjacent VCMs, providing savings of at least a width of a magnet+two mechanical shields+a magnetic shield greater than 1.5 mm (out of ~10 mm). Each reduction of 1 mm in the separation of VCMs can reduce computational time by ~10%.

Simplified Camera with Unified AF

Figure 6A:
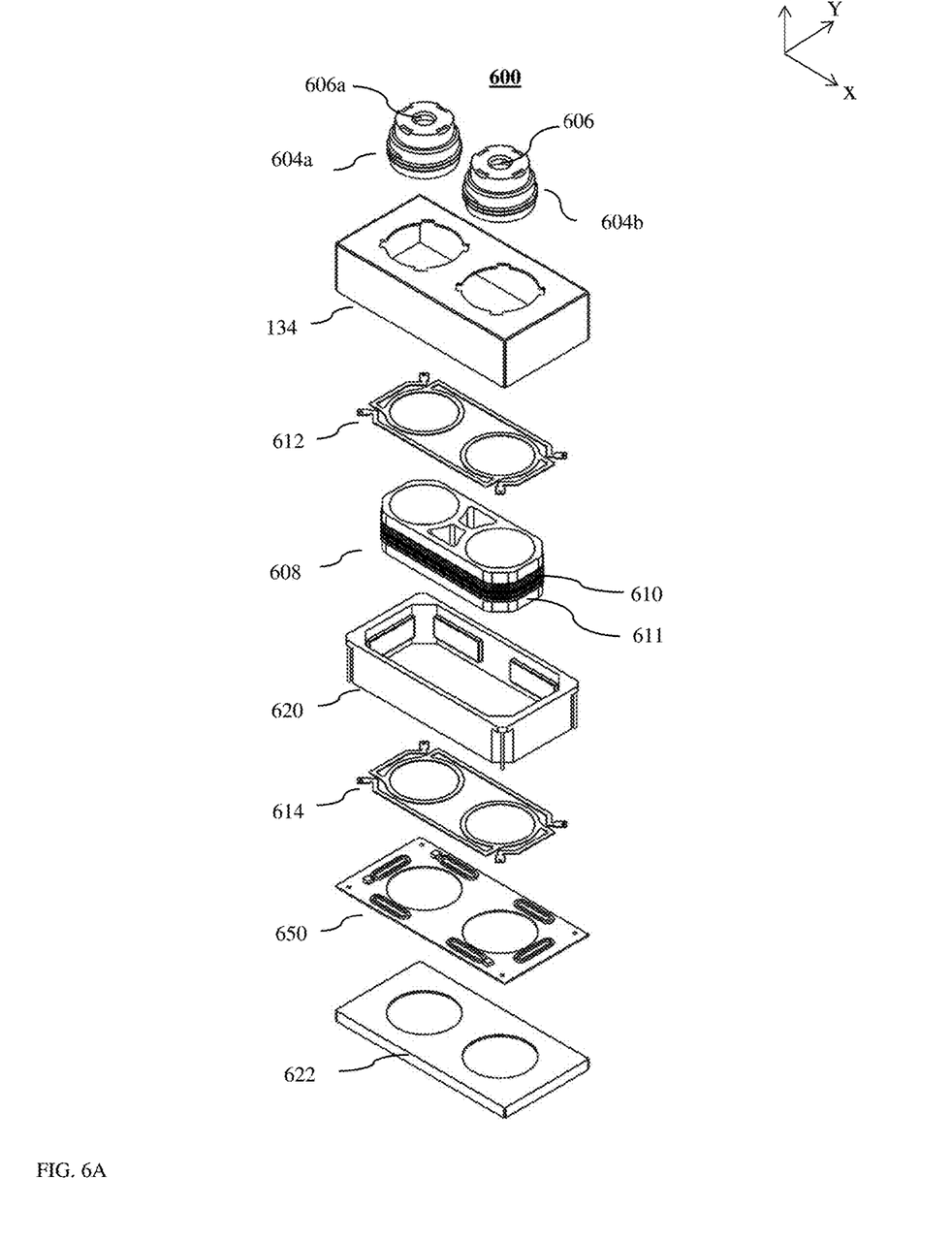
FIG. 6A shows schematically an exploded view of another embodiment of a dual-optical module camera having a single VCM with a combined AF+OIS actuator.
Figure 6B:
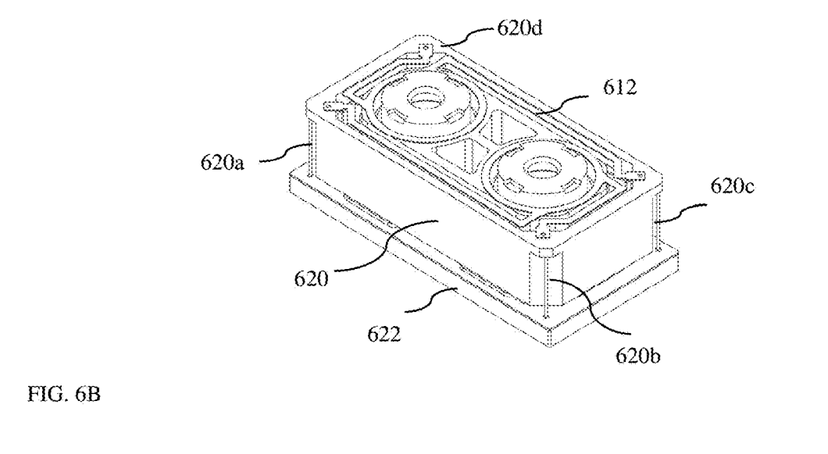
FIG. 6B shows the camera of FIG. 6A in an isometric view.
Figure 6C:
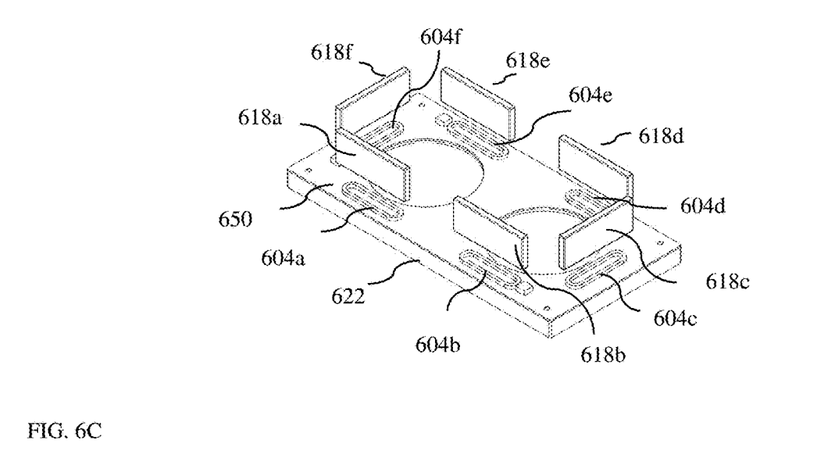
FIG. 6C shows an isometric view of a magnet set embodiment of six magnets in the camera of FIG. 6B.
Figure 6D:
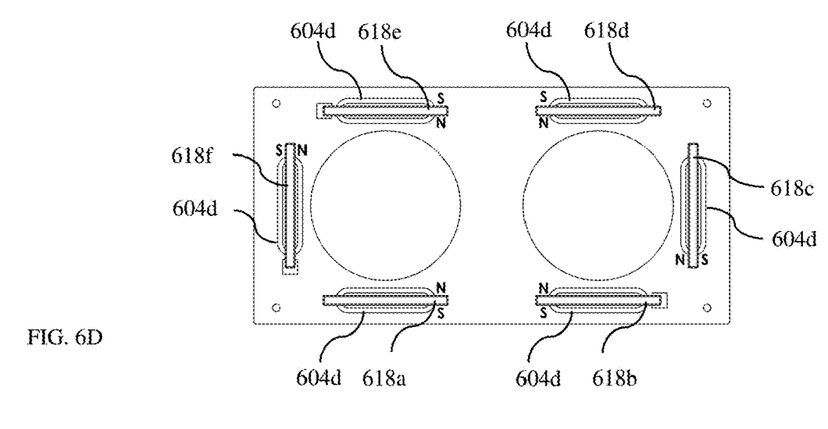
FIG. 6D shows a top view of the six magnets of the embodiment in FIG. 6C and associated pole directions.
Figure 6E:
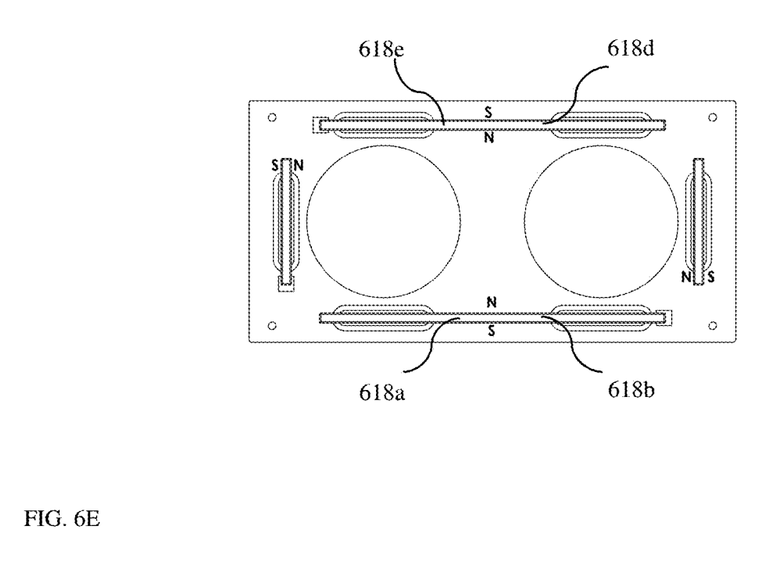
FIG. 6E shows a top view of another magnet set embodiment with four magnets and associated pole directions in a camera embodiment as in FIG. 6A.

FIG. 6A shows schematically an exploded view of embodiment 600 of a dual-optical module camera having a single VCM with a combined AF+OIS actuator. FIG. 6B shows camera 600 in an isometric view. FIG. 6C shows an isometric view of a magnet set embodiment with six magnets. FIG. 6D shows a top view of six coils under the six magnets. FIG. 6E shows a top view of an embodiment with six coils under four magnets.

Camera 600 is similar to camera 200 and includes similar components, except for a single AF-actuation assembly for performing simultaneous (in unison) auto-focusing of the two lenses (instead of the two AF actuation sub-assemblies 102a and 102b in camera 200 that perform separate auto-focusing on each lens). Camera 600 further includes a single OIS mechanism. Camera 600 is suited for the cases in which the two lens modules are identical, or at least have equal focal length, which allows focusing to the same distance.

Camera 600 includes two optical lens modules, respectively 604a and 604b, each lens module including a lens element, respectively 606a and 606b, optically coupled to a respective image sensor (not shown). Each lens module may have dimensions as follows: a diameter in the range 6-7 mm, a height of about 4 mm and a fixed focal length in the range of 4-8 mm. The two lens barrels are identical in their focal length and may be completely identical or different in some aspects such as diameter or F#. The two lens barrels are housed in a single lens carrier 608. The lens carrier is typically made of a plastic material. The lens carrier has a coil 610 wound around at least part of an external lens carrier surface 611. The coil is typically made from copper wire coated by a thin plastic layer (coating) having inner/outer diameters of respectively in the range of 50-60 um, with several tens of turns. such that the total resistance is typically on the order of 10-30 ohms.

The AF actuation sub-assembly further includes a spring set 602, including two (upper and lower) springs, 612 and 614. Springs 612 and 614 may be identical, as shown in this embodiment. In other embodiments, they may vary in shape, spring constants, dimensions and materials. The set of springs acts a single linear rail that suspends the AF actuation sub-assembly. The linear rail is typically flexible in one direction of motion, namely along the Z axis (optical axis of the suspended lens), with a typical stiffness of 20-40 N/m, and is very stiff along the other two axes of motion, namely in the X-Y plane (or perpendicular to the optical axis of the suspended lens), with a typical stiffness >500 N/m.

Camera 600 further includes a set of six magnets (numbered 618a-f), all housed (glued) in a single plastic or metallic "housing" frame 620. Magnets 618a-f may all be identical, as in this embodiment. In other embodiments, they may vary in shape, magnetic field, dimensions and materials. The magnets arrangement is shown FIG. 6C. The spring sets of the AF actuation sub-assembly are hung on frame 620 and allow motion as described above. The AF actuation sub-assembly, the housing frame and the six magnets form a single AF-actuation assembly. Housing frame 620 is suspended on a suspension spring system comprising four round springs 620a, 620b, 620c and 620d (FIG. 6B), which may be similar to springs 220a-d above. The AF actuation sub-assembly and the four springs form a combined AF+OIS actuation assembly. Camera 600 further includes OIS motion coils 604a-f positioned on a PCB 650 glued on base 622. Coils 604a-f are positioned under respective magnets 618a-f and apply a Lorentz force on the respective magnets. Camera 600 further includes sensing elements (e.g. Hall bars) 606a-c (FIG. 6C) that can measure a magnetic field and indicate the position of the combined AF+OIS actuation assembly in X-Y plane. Such a motion in the X-Y plane allows performance of OIS, by compensating for hand movements that shift and tilt the camera module with respect to the object to be captured, as known in the art.

Coils 604a-f may be operated in various actuation modes. In some such actuation modes, currents are directed through only some of the coils. In some such actuation modes, current are directed through all of the coils. In all modes of operation there is a complete decoupling between different modes of motion, namely between each of the two Z-direction motions of the two lenses relative to frame 620 and the X-Y motion of frame 620 relative to the base.

FIG. 6F shows a top view of another magnet set embodiment in which magnets 618a+618b and 618d+618e are joined (e.g. sintered) essentially reducing the number of magnets from six to four.

The operation of AF and OIS mechanisms in camera 600 is essentially similar to those described for cameras 100 and 200, both mechanically and magnetically.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. An imaging device comprising:
   a) a first lens module having a first optical axis and including a first lens carrier with a first lens carrier external surface, the first lens carrier having a first coil wound around at least part of the first lens carrier external surface and a first plurality of magnets surrounding the first coil;

b) a second lens module having a second optical axis parallel to the first optical axis and including a second lens carrier with a second lens carrier external surface, the second lens carrier having a second coil wound around at least part of the second lens carrier external surface and a second plurality of magnets surrounding the second coil, wherein the first and second pluralities of magnets share at least one common magnet and wherein each of the first and second plurality of magnets is part of an auto-focus sub-assembly of the respective lens module; and c) an OIS mechanism comprising a plurality of optical image stabilization (OIS) coils, wherein each OIS coil is associated with at least one of the magnets of the first plurality or second plurality of magnets, the magnets of the first plurality and second plurality of magnets being coupled to each other by a frame, and wherein the OIS coils are configured to move the frame in a plane substantially perpendicular to both the first optical axis and the second optical axis to perform OIS.

2. The imaging device of claim 1, wherein the magnets of the first plurality of magnets have north poles pointing toward the first optical axis and wherein the magnets of the second plurality of magnets have south poles pointing toward the second optical axis.

3. The imaging device of claim 1, wherein the first and second pluralities of magnets include a combined total of four to seven magnets.

4. The imaging device of claim 1, wherein each of the first and second lens carriers and associated coils is movable relative its respective plurality of magnets and the frame, and wherein the movement of each lens carrier and associated coil is independent of the movement of the other lens carrier and associated coil.

5. The imaging device of claim 1, wherein the first and second pluralities of magnets include a combined total of four to seven magnets.

6. The imaging device of claim 1, further comprising a position sensing mechanism for sensing motion in two directions in a plane perpendicular to the optical axes, the position sensing in one direction being independent of the position sensing in the other direction.

7. The imaging device of claim 6, wherein the position sensing mechanism includes at least one Hall bar.

8. The imaging device of claim 1, further comprising a position sensing mechanism for sensing unwanted roll motion of the frame around a roll axis that is substantially parallel to both optical axes, wherein the OIS mechanism is further configured, responsive to sensing the unwanted roll motion of the frame, to rotate the frame around the roll axis in order to cancel the unwanted roll motion.

9. The imaging device of claim 8, wherein the roll motion sensing mechanism includes at least one Hall bar.

10. The imaging device of claim 8, wherein the position sensing mechanism for sensing unwanted roll motion of the frame around a roll axis includes at least two sensors, and wherein the unwanted roll motion is detected based on a difference between the measurements of the two sensors.

* * * * *